Oct. 22, 1963 M. KNOBEL 3,107,743
ELECTROMAGNETIC CONTROL MEANS FOR A WEIGHING MACHINE
Filed Oct. 10, 1960 3 Sheets-Sheet 1

INVENTOR.
Max Knobel
BY Robert R. Churchill
ATTORNEY

Oct. 22, 1963　　　　　M. KNOBEL　　　　　3,107,743
ELECTROMAGNETIC CONTROL MEANS FOR A WEIGHING MACHINE
Filed Oct. 10, 1960　　　　　　　　　　　3 Sheets-Sheet 3

INVENTOR.
Max Knobel
BY
Robert P. Churchill
ATTORNEY

# United States Patent Office 3,107,743
Patented Oct. 22, 1963

3,107,743
ELECTROMAGNETIC CONTROL MEANS FOR
A WEIGHING MACHINE
Max Knobel, Boston, Mass., assignor to Pneumatic Scale
Corporation, Limited, Quincy, Mass., a corporation of
Massachusetts
Filed Oct. 10, 1960, Ser. No. 61,731
7 Claims. (Cl. 177—116)

This invention relates to a weighing machine.

The invention has for an object to provide a novel and improved weighing machine which is capable of performing the weighing operation upon minute movement of the weighing element in an extremely rapid and accurate manner.

The invention has for a further object to provide a novel improved weighing machine having weighing mechanism provided with a movable weighing element and which includes novel electromagnetic control means for cooperation with the movable element capable of measuring minute deflections of the weighing element in a manner such as to perform the weighing operation in an extremely rapid and accurate manner.

With these general objects is view and such others as may hereinafter appear, the invention consists in the weighing machine and in the various structures, arrangements and combinations of parts hereinafter described and particularly defined in the claims at the end of this specification.

In the drawings illustrating the preferred embodiment of the invention:

Figure 4:
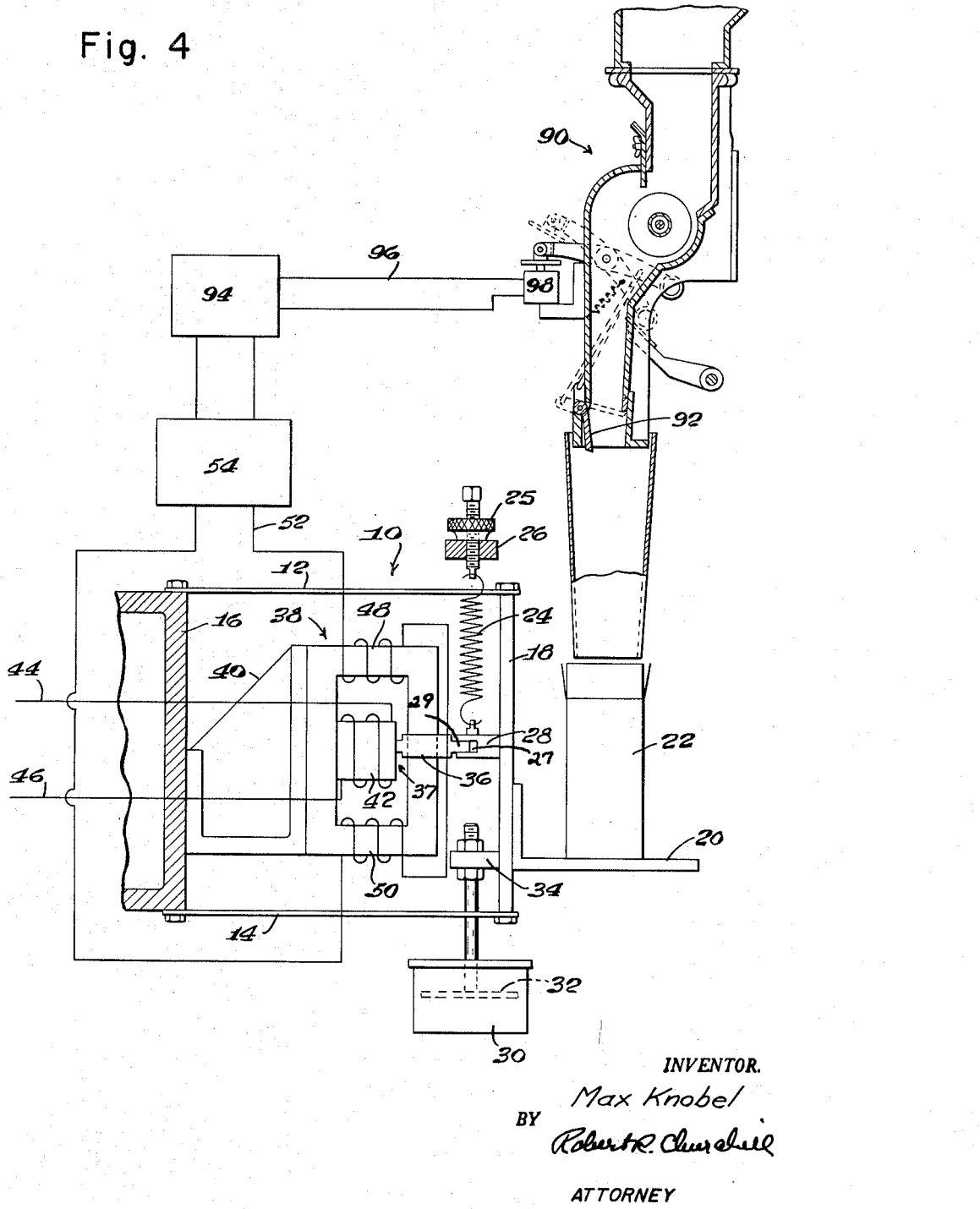
Figure 5:
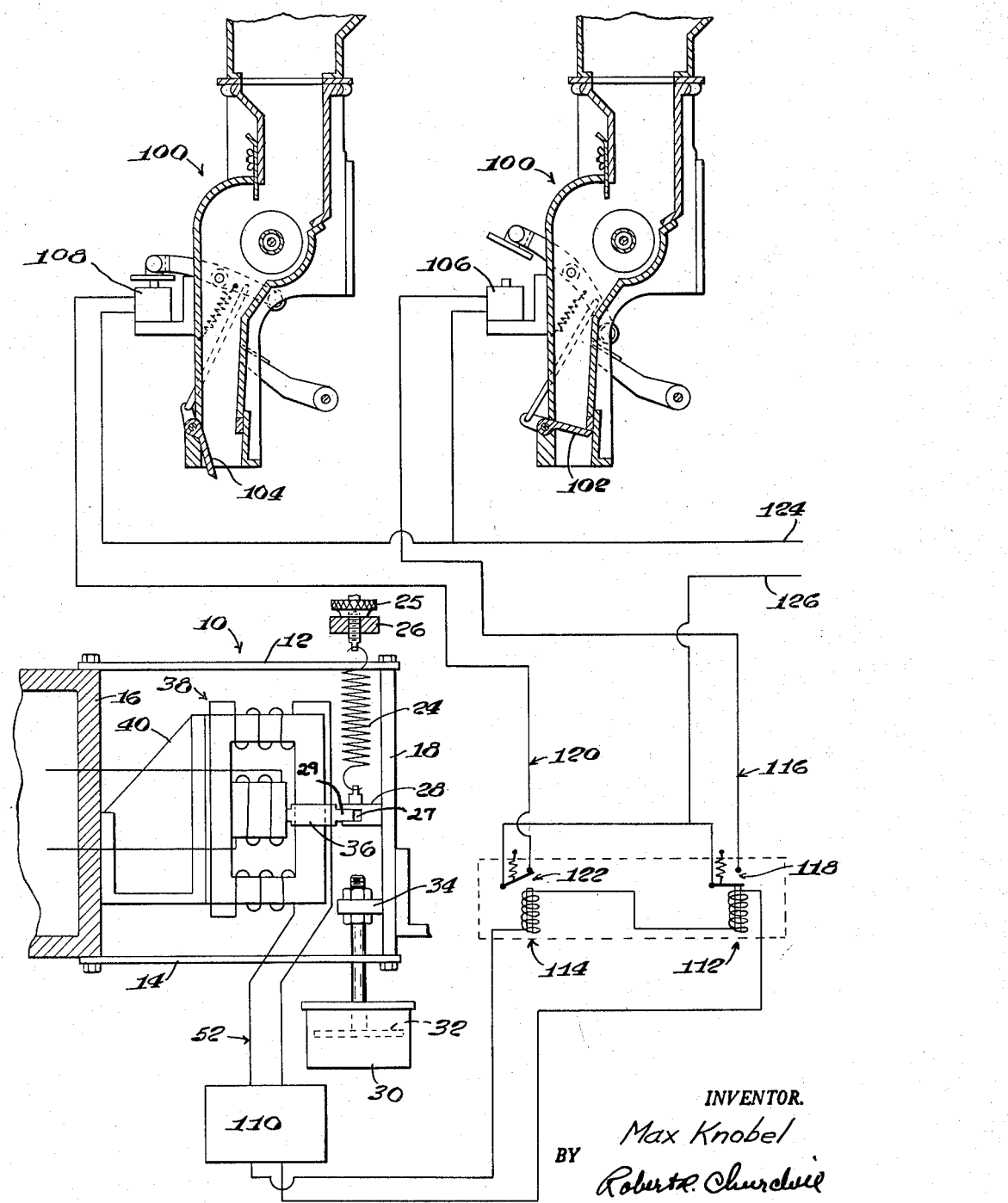

FIG. 4 is a side elevation partly in cross section of a feed hopper associated with the present weighing mechanism and showing the electromagnetic control means operative to terminate the feed when a predetermined weight is reached; and FIG. 5 is a view similar to FIG. 4 illustrating a feed hopper having bulk and drip stream controls and showing the electromagnetic control means operative to terminate the bulk stream and the drip stream when different predetermined weights are reached.

In general the invention contemplates the provision of a weighing machine designed to perform the weighing operation with more accuracy and in a more rapid manner than prior comparable weighing machines of which I am aware. In accordance with the invention the weighing machine is provided with a weighing element and with electromagnetic control mechanism responsive to minute deflection of the weighing element arranged to initiate the operation of an instrumentality when the weighing element has been thus deflected into a predetermined position. Depending upon the type of weighing machine, the instrumentality whose operation is thus initiated by such minute movement of the weighing element may, for example, take the form of an indicator, as in a check weigher, or it may take the form of mechanism for controlling the operation of feeding material in a stream upon the weighing element.

The invention is herein illustrated as comprising a weighing machine having a cantilever type weighing element arranged to cooperate with novel electromagnetic control means, herein shown as comprising a position sensitive transducer of extreme sensitivity capable of measuring minute deflections of the weighing element. The position sensitive transducer is provided with a conducting loop in the form of an armature which for convenience of description will be hereinafter referred to as an "armature" and which is operatively connected to and movable with the weighing element and which is adapted to effect variations in the output voltage of the transducer upon minute movement of the weighing element. Accordingly, in one embodiment of the invention illustrated herein, provision is made for utilizing such variations in output voltage in a check weighing machine for indicating or recording the variations in weight of a load from a predetermined weight. In another embodiment of the invention provision is made for utilizing such variaitions in output voltage of the transducer in a weighing machine for operatively controlling the feeding mechanism in a manner such as to discontinue the feed of the material when a predetermined weight is reached. In a further embodiment of the invention the variations in output voltage of the transducer may be utilized for controlling the feed of material in a weighing machine of the type adapted to permit two weighing operations to be performed during each cycle of operation, first a bulk or primary load weighing operation, and then a final or drip load weighing operation wherein different variations in output voltage are arranged to first discontinue the bulk stream when a predetermined primary weight is reached and to thereafter discontinue the drip stream when a predetermined final weight is reached.

Referring now to the drawings, the present invention, for purposes of illustration, has been shown as embodied in a weighing machine in which the weighing element comprises a cantilever type weighing beam indicated generally at 10 and which includes two pairs of relatively stiff leaf springs 12, 14 secured at one end to a fixed part of the frame 16 and at their free ends connected by a rigid member 18 provided with a load supporting platform 20 upon which the load to be weighed is placed, herein shown as a filled carton 22. The weight of the load may be partially supported by a coil spring 24 secured to a fixed part of the machine frame 26 and at its lower end to an arm 28 projecting from and integral with the member 18. In order to damp and prevent premature and undesirable oscillations of the weighing element 10 during the weighing operation a dash pot 30 is provided having a piston 32 moving in oil and rigidly connected to an arm 34 extended from the member 18 as shown.

The arm 28 is operatively connected to the armature 36 forming a part of a position sensitive transducer, indicated generally at 38, which may be supported by a bracket 40 attached to the frame member 16. In accordance with the present invention the armature is slidably mounted, and the arm 28 connected to the vertical rigid member 18 is provided with a slot or groove 27. The armature 36 is provided with a tongue 29 arranged to be slidable in groove 27. In this manner the relative movement of the armature 36 and the weighing element 10 is linear, thereby providing a sensitive and accurate indication of the true over or underweight of the load being weighed. The position sensitive transducer may comprise an electromagnetic measuring instrument, the essential elements of which include a laminated magnetic structure having three legs provided with a coil on each leg, the central leg 42 being provided with an air gap in which the armature 36 is free to travel. In operation when an alternating current is passed through the central coil through the input leads 44, 46, an alternating magnetic flux flows through the central leg 42, across the air gap and through each of the outside legs 48, 50. The armature 36 is non-magnetic and is not subject to magnetic attraction, and in practice acts as a magnetic insulator resisting the passage of any alternating flux through itself. When the armature is in the center of the air gap 37 the flux divides equally between the outside legs 48, 50, and when the armature is moved to one side of the air gap the flux is greater in one outside leg than in the other. A voltage is induced in the coils on the outside legs, this voltage being proportional to the flux linking the coils. As herein shown, the two outside coils are in series with induced voltage opposed to each other so that in operation the output voltage is proportional to the flux difference in the two legs. This in turn is proportional to the displacement of the armature 36, the output voltage being zero when the armature is in a central position, and movement of the armature from the center causing the output voltage to increase linearly. The output signal is in phase with the input on one side of zero and 180° out of phase on the other side of zero. Thus, in the operation of the weighing machine movement of the weighing element 10 under the influence of the load to be weighed effects movement of the armature to vary the output voltage, which in turn is substantially proportional to variations in weight of the load. In practice the output circuit 52 may be provided with an amplifier diagrammatically indicated at 54 and may be operatively connected to various instrumentalities for indicating the weight of the load or for initiating operation of control means for controlling the weight of the load.

The position sensitive transducer is extremely sensitive and quickly responsive to a relatively small reaction force, being adapted to measure minute displacements of the armature, and responding to a deflection movement as small as .0001" or less. The output voltage is extremely linear over the central 0.4" of travel of the armature, maximum electrical output being obtained at about 0.3" movement on each side of the zero position. In operation the cantilever type weighing element 10 may be adjusted to be deflected a minute amount when a predetermined weight of material is placed thereon, the relatively stiff leaf springs being selected so as to have a deflection value lying between .00002" and .005" per 1% of the load to be weighed. It has been determined that the sensitivity of the cantilever beam weighing element is such that a deflection of .000010" may be effected by a weight of .01 of an ounce. Thus, it will be seen that the minute deflection of the weighing element transmitted through the novel tongue and groove connection between the armature and weighing element to the transducer results in a weighing machine capable of weighing with extreme accuracy and rapidity to determine variations in weight from a predetermined weight or for initiating operation of control means for controlling the weight of a load.

Figure 1:
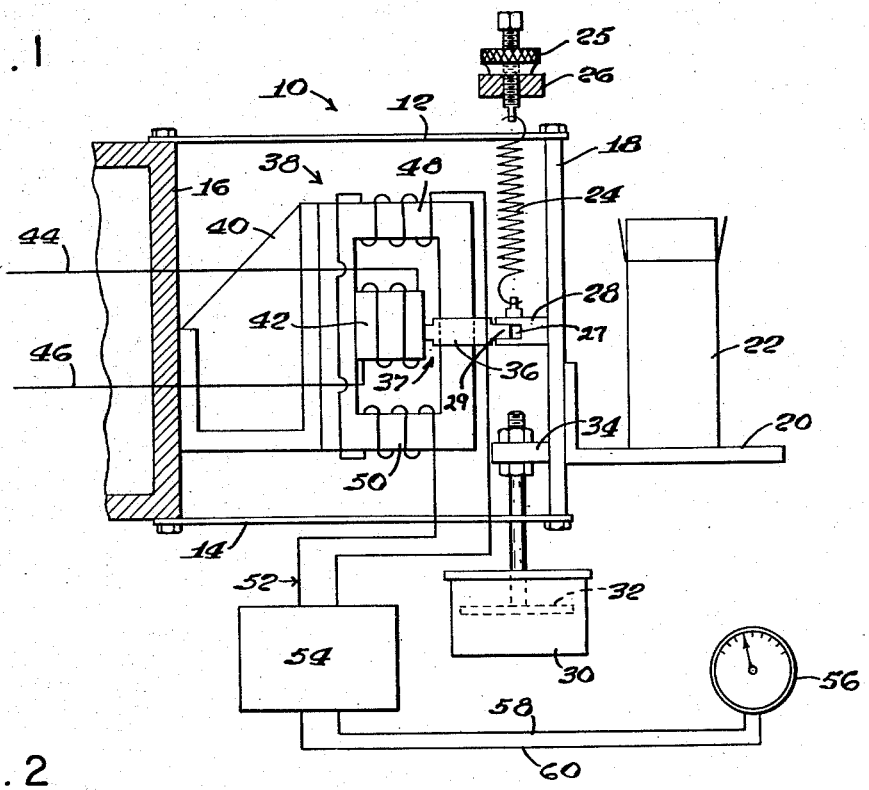
FIG. 1 is a side elevation partly in cross section of check weighing mechanism embodying the present invention showing electromagnetic control means operatively connected to the weighing element and to an indicating volt meter arranged to indicate the weight of the load being check weighed.

In FIG. 1 the invention is illustrated as embodied in a check weigher wherein the load to be check weighed, herein shown as a filled carton 22, is placed on the load supporting platform 20 of the weighing element. In this embodiment of the invention the cantilever beam weighing element 10 may be initially adjusted by the spring means 24 and adjusting nut 25 to assume a central or zero position relative to the central leg 42 of the structure when no load is present, and to be deflected downwardly when the load to be check weighed is placed on the load supporting platform 20. Thus, an output voltage is induced in the transducer 38 proportional to the deflection of the beam under the influence of the load being check weighed, and such voltage passed through the amplifier 54 may be read by an indicating volt meter 56 connected by the leads 58, 60 to the amplifier, as shown, whereby to determine the weight of the load or variation in weight from a predetermined weight.

Figure 2:
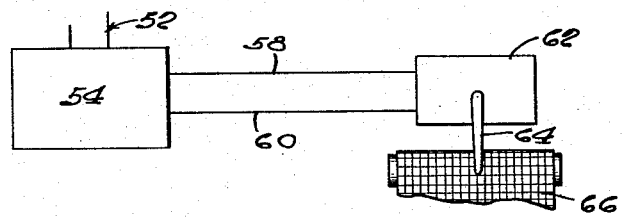
FIG. 2 is a diagrammatic view showing a stylus cooperating with a weight recording graph and adapted for connection to the output circuit of the electromagnetic control means shown in FIG. 1.

As diagrammatically illustrated in FIG. 2, the amplified output circuit leads 58, 60 may be connected to a recording volt meter 62 of any usual or preferred form and provided with a stylus 64 cooperating with a graph sheet 66 so that variations in weights of successive check weighed loads may be recorded.

Figure 3:
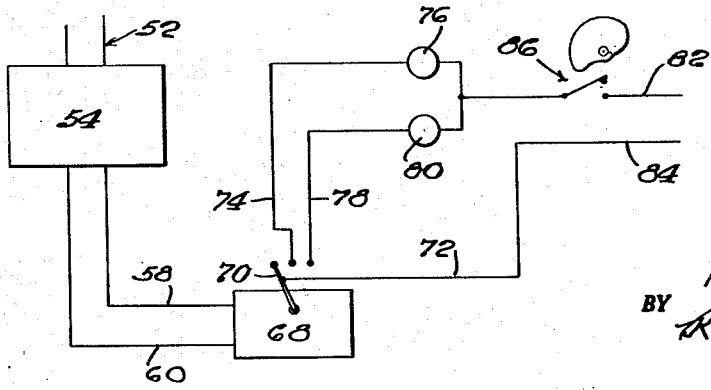
FIG. 3 is a wiring diagram of signal means adapted to be controlled by the output circuit of the electromagnetic device for visually indicating variations in weights from a predetermined weight of successive loads placed on the weighing element.

In FIG. 3 the present electromagnetic control device is arranged to control signal means for visibly indicating overweight and underweight loads being check weighed. As therein illustrated, the amplified output circuit leads 58, 60 may be connected to a recording volt meter 68 having movable contact arm 70 arranged to close a signal circuit through leads 72, 74 to light a lamp 76 when a relatively small armature displacement causes a relatively small voltage in the output circuit indicating an underweight load. A relatively greater armaure displacement will cause the contact arm 70 to close a circuit through leads 72, 78 to light a lamp 80 indicating an overweight load, an intermediate position of the contact arm indicating a correct weight load. The signal circuit includes supply leads 82, 84 arranged to be controlled by a cam operated switch 86 of conventional design arranged to be closed after the load has been placed on the load receiving platform 20 of the weigher and the contact arm 70 has been moved to a position corresponding to the weight of the load.

Referring now to FIG. 4, the invention is therein illustrated as embodied in a weighing machine having material feeding mechanism indicated generally at 90 provided with a gate 92 arranged to interrupt the material feeding operation when a predetermined weight is reached on the load receiving member of the weighing element. For clarity of illustration the mechanical features of the material feeding hopper 90 have been omitted and may comprise those illustrated and described in my Patent No. 2,634,080, dated April 7, 1953, for Weighing Machine. As illustrated in FIG. 4, the weighing element 10 and associated electromagnetic control means, including the position sensitive transducer 38, may comprise those illustrated in FIG. 1, the output circuit 52 being connected to the amplifier 54 and a relay 94 arranged to close a circuit 96 to a solenoid 98 for operating the gate closing mechanism illustrated in the patent above referred to for terminating the flow of the material from the hopper. In operation the weighing element 10 may be adjusted to present the armature 36 a short distance above the center or zero position prior to introducing material onto the load receiving member of the weighing element whereby a sufficient output voltage is normally induced to energize the solenoid 98 to maintain the gate 92 in its open position, as shown, during the weighing operation. Thereafter when a predetermined weight is reached, deflection of the weighing element will move the armature to the zero position, thus effecting deenergization of the solenoid 98 to permit spring closing of the gate 92.

In the embodiment of the invention shown in FIG. 5 the electrical control mechanism is shown as operatively connected to material feeding mechanism of the type illustrated in my Patent No. 2,634,080, above referred to, for feeding the bulk and drip loads to the load receiving receptacle of the weighing machine. As shown in FIG. 5, the numeral 100 indicates in cross section a divided feed hopper, one view showing a cross section of the hopper which includes the bulk feed gate 102, and the other view showing a cross section of the same hopper which includes the drip feed gate 104, each gate having individual solenoids 106, 108 normally energized to hold both gates 102, 104 open at the start of the weighing operation. As herein shown, the output voltage circuit 52 of the position sensitive transducer is connected through an amplifier 110 to a pair of relays 112, 114 arranged in series, one relay 112 being arranged to be energized upon passing of a relatively small current through the coil thereof, and the other relay 114 being arranged to be energized upon passing of a relatively larger current therethrough. The weighing element 10 may be initially adjustable to present the the armature 36 at the zero position. A circuit 116 connected to the bulk feed solenoid 106 is provided with a normally closed switch 118 arranged to be opened when the relay 112 is actuated by a relatively small current upon a relatively small movement of the armature from a zero position under the influence of the load whereby to open the circuit at the switch 118 to release the spring closed gate 102 and discontinue the bulk feed stream when a predetermined primary weight is reached. A second circuit 120 connected to the drip feed solenoid 108 is provided with a similar switch 122 arranged to be opened when the relay 114 is actuated by a relatively larger current upon further displacement of the armature 36 from the zero position whereby to release the spring closed gate 104 and discontinue the drip feed stream when a predetermined final weight is reached. As shown in FIG. 5, the bulk and drip circuits 116, 120, respectively, are arranged in parallel from supply lines 124, 126.

From the above description it will be seen that the present weighing machine embodying a cantilever type weighing element and provided with an electromagnetic measuring device of the type disclosed is capable of producing an electrical signal proportional to the deflection of the weighing element under the influence of the load being weighed, and such a weighing structure is adapted for quickly and accurately performing the weighing operation with a minute deflection of the weighing element. In practice the relatively stiff leaf springs 12, 14 of the weighing element are selected so that the weighing element has a relatively small deflection value, lying between .00002" and .005" per 1% of the load to be weighed when such a force is applied to the weighing element. The weighing element comprising the stiff leaf springs and the load receiving member is preferably of lightweight construction so that the response of the weighing element and associated parts may be extremely rapid.

This application is a continuation of my copending application Serial No. 538,445, filed October 4, 1955, now abandoned.

While the preferred embodiment of the invention has been herein illustrated and described, it will be understood that the invention may be embodied in other forms within the scope of the following claims.

Having thus described the invention, what is claimed is:

1. For use in a weighing machine provided with a weighing element having means for supporting a load to be weighed and adapted to be deflected in an amount proportional to the load, said weighing element comprising a plurality of relatively stiff vertically spaced and parallel upper and lower leaf springs, each secured at its inner end to a stationary support, a tie member connecting the outer ends of said leaf springs, an elongated coil spring cooperating with the leaf springs to yieldingly support a portion of the weight of the load, means connected with said leaf springs for damping the vibrations thereof, the improvement comprising electromagnetic means for measuring minute deflections of said leaf springs under the influence of a load placed on said supporting means, said electromagnetic means including a position sensitive transducer having an input circuit and an output circuit and stationarily mounted intermediate said upper and lower leaf springs, said transducer having a vertical portion parallel to and spaced from said tie member, said vertical portion being provided with an armature operatively connected to and movable with said weighing element, said armature being slidably mounted on said vertical portion and having a tongue and groove connection with an extension from the tie member of said weighing element whereby the relative movement between said armature and weighing element in response to the load being weighed is linear, said electromagnetic means having provision whereby minute movement of said armature operates to vary the voltage in the output circuit of the transducer in an amount proportional to the deflection movement of the weighing element, and electroresponsive means connected in said output circuit and actuated by said voltage variations.

2. Electromagnetic measuring means for use in a weighing machine as defined in claim 1 wherein the relatively stiff leaf springs are selected so as to have a deflection value lying between .00002" and .005" per 1% of the load to be weighed, and wherein said position sensitive transducer is responsive to a deflection movement of the armature as low as .0001" or less.

3. Electromagnetic measuring means for use in a weighing machine as defined in claim 1 wherein the electroresponsive means comprises indicating means for indicating the weight of the load.

4. Electromagnetic measuring means for use in a weighing machine as defined in claim 1 which includes graphic recording means cooperating with said electroresponsive means for recording variations in weights of succesive loads.

5. Electromagnetic measuring means for use in a weighing machine as defined in claim 1 which includes a signal circuit cooperating with said electroresponsive means for visibly indicating weights of successive loads above and below a predetermined weight.

6. For use in a weighing machine provided with a movable weighing element having means for supporting the load to be weighed and adapted to be deflected in an amount proportional to the load, means for feeding a stream of the material to be weighed onto the load receiving member of the weighing element, the improvement comprising electrical control means for controlling the operation of the stream feeding means, said control means including a position sensitive transducer having an input circuit and an output circuit and provided with an armature operatively connected to and movable with said weighing element, said armature being slidably mounted and having a tongue and groove connection with said weighing element whereby the relative movement between said armature and weighing element in response to the load being weighed is linear, said control means having provision whereby minute movement of said armature operates to vary the voltage in the output circuit of the transducer in an amount substantially proportional to the deflection of the weighing element, means for amplifying the voltage variations in said output circuit, and electroresponsive means operatively connected in said output circuit and responsive to variations in said voltage for terminating the feeding operation when a predetermined weight is reached, said weighing element comprising a plurality of vertically spaced and parallel upper and lower stiff leaf springs, each secured at its inner end and to a stationary support, a tie member connecting the outer ends of said leaf springs, an elongated coil spring cooperating with the leaf springs to yieldingly support a portion of the weight of the load, and means connected with said leaf springs for damping the vibrations thereof, said relatively stiff leaf springs being selected so as to have a deflection value lying between .00002" and .005" per 1% of the load to be weighed, and said position sensitive transducer being responsive to a deflection movement of the armature as low as .00001" or less, said transducer being stationarily mounted intermediate said upper and lower leaf springs and having a vertical portion parallel to and spaced from said tie member, said tongue and groove connection including a tongue extended from said armature cooperating with a groove formed in an extension from said tie member.

7. For use in a weighing machine provided with a movable weighing element having means for supporting the load to be weighed and adapted to be deflected in an amount proportional to the load, means for feeding a bulk stream of the material to be weighed onto the load receiving member of the weighing element, means for feeding a drip stream onto the load receiving member of the weighing element, the improvement comprising electrical control means for measuring minute deflections of the weighing element and for controlling the operation of the bulk and drip stream feeding means, said control means including a position sensitive transducer having an input circuit and an output circuit and provided with an armature operatively connected to and movable with said weighing element, said armature being slidably mounted and having a tongue and groove connection with said weighing element whereby the relative movement between said armature and weighing element in response to the load being weighed is linear, said control means having provision whereby minute movement of said armature operates to vary the voltage in the output circuit of the transducer in an amount substantially proportional to the deflection movement of the weighing element, means for amplifying the voltage variations in said output circuit and electroresponsive means connected in said output circuit and actuated by said voltage variations, and means cooperating with said electroresponsive means and operatively connected with the bulk and drip feeding means for terminating their feeding operations when the voltage reaches different amounts, said weighing element comprising a plurality of upper and lower vertically spaced and parallel stiff leaf springs, each secured at its inner end and to a stationary support, a tie member connecting the outer ends of said leaf springs, an elongated coil spring cooperating with the leaf springs to yieldingly support a portion of the weight of the load, and means connected with said leaf springs for damping the vibrations thereof, said relatively stiff leaf springs being selected so as to have a deflection value lying between .00002″ and .005″ per 1% of the load to be weighed, and said position sensitive transducer being responsive to a deflection movement of the armature as low as .0001″ or less, said transducer being stationarily mounted intermediate said upper and lower leaf springs and having a vertical portion parallel to and spaced from said tie member, said tongue and groove connection including a tongue extended from said armature cooperating with a groove formed in an extension from said tie member.

References Cited in the file of this patent

UNITED STATES PATENTS

| | | |
|---|---|---|
| 1,233,124 | Powers | July 10, 1917 |
| 2,634,081 | Knobel | Apr. 7, 1953 |
| 2,755,057 | Knobel | July 17, 1956 |
| 2,763,457 | Gregory | Sept. 18, 1956 |
| 2,932,501 | Hicks | Apr. 12, 1960 |

FOREIGN PATENTS

| | | |
|---|---|---|
| 182,110 | Switzerland | May 1, 1936 |